United States Patent [19]
Dzombak et al.

[11] Patent Number: 5,837,145
[45] Date of Patent: Nov. 17, 1998

[54] METHOD FOR TREATING WATER CONTAMINATED WITH CYANIDE

[75] Inventors: David A. Dzombak; Rajat S. Ghosh; Richard G. Luthy, all of Pittsburgh, Pa.

[73] Assignee: Aluminum Company of America, Pittsburgh, Pa.

[21] Appl. No.: 862,204

[22] Filed: May 23, 1997

[51] Int. Cl.⁶ .................................................... C02F 1/58
[52] U.S. Cl. ...................... 210/715; 166/310; 210/717; 210/747; 210/904; 405/128; 423/367
[58] Field of Search ................... 210/702, 714, 210/715, 716, 717, 724, 726, 747, 904; 175/64; 166/244.1, 267; 423/367; 405/128

[56] References Cited

U.S. PATENT DOCUMENTS

| | | | |
|---|---|---|---|
| 3,922,224 | 11/1975 | Lewandowski | 210/223 |
| 4,548,718 | 10/1985 | Muir | 210/719 |
| 5,160,632 | 11/1992 | Kleefisch et al. | 210/724 |
| 5,266,213 | 11/1993 | Gillham | 210/747 |
| 5,362,394 | 11/1994 | Blowes et al. | 210/617 |
| 5,487,622 | 1/1996 | Cherry et al. | 405/128 |
| 5,534,154 | 7/1996 | Gillham | 210/668 |

FOREIGN PATENT DOCUMENTS 50000656  1/1975  Japan ....................................... 210/904

OTHER PUBLICATIONS

Howe, Robert H.L., "Recent Advance in Cyanide Waste Reduction Practice", 18th Industrial Waste Conference, pp. 690–705, Purdue University, 1963.

*Primary Examiner*—Peter A. Hruskoci
*Attorney, Agent, or Firm*—Diane R. Meyers; Glenn E. Klepac

[57] ABSTRACT

A method for treating cyanide contaminated water is disclosed. This method generally involves passing the contaminated water through a bed containing elemental iron, to form a precipitate by a reaction between the iron and any of various cyanide species which exist in the water. The method can be applied either above ground or in situ in the subsurface environment.

19 Claims, 3 Drawing Sheets

METHOD FOR TREATING WATER CONTAMINATED WITH CYANIDE

BACKGROUND OF THE INVENTION

1. Field of the Invention

The present invention relates to a method for treating water that has been contaminated with cyanide. More specifically, the method involves passing the water through a bed containing elemental iron, either alone or in combination with a porous material; this results in the formation of a precipitate between the iron and the cyanide or cyanide-containing compound. The water can be either above ground, such as pumped groundwater or industrial waste water, or can be groundwater in situ in the subsurface environment.

2. Background Information

Water generated in industrial processes and groundwater in the subsurface environment may contain various kinds of contamination, including, for example, cyanide. Contamination of waste leachates and groundwater with cyanide is an issue at former or active industrial sites, such as sites of electroplating processes, heap leaching, mining processes, coal conversion processes such as coal coking and coal gasification operations, and aluminum smelting sites. For example, subsurface cyanide contamination exists at many of the thousands of former manufactured gas plant (MGP) sites in the U.S.

Cyanide is relatively soluble in water; available data indicate that its various chemical forms do not sorb onto many aquifer materials at pH values typical of groundwater. Based on observations from the field, it appears that cyanide can be fairly mobile in the subsurface environment, especially in sand and gravel aquifers.

Because of the potential hazards associated with cyanide, control and remediation of cyanide contaminated water is usually desired. Cyanide-contaminated water is often treated by alkaline chlorination or biological oxidation. These techniques are only effective for free cyanide (HCN, CN$^-$) and cyanide that is weakly bonded to metals. Cyanide that is strongly bonded, or complexed, with metals cannot be treated with these methods.

The conventional manner by which subsurface cyanide contamination is controlled involves pumping contaminated groundwater from the subsurface and treating it in above-ground treatment processes. The treated water may be reinjected to the aquifer, or the water may be discharged to a stream or other surface water body under a discharge permit.

Cyanide can exist in solution as free cyanide (HCN or CN$^-$) and/or as complexes with metals such as cadmium, cobalt, copper, nickel, zinc, iron and others. Among the strongest metal-cyanide complexes, and often the most important in environmental systems, are the iron-cyanide complexes ferrocyanide [Fe(CN)$_6^{4-}$], in which iron is in the +2 oxidation state, and ferricyanide [Fe(CN)$_6^{3-}$], in which iron is in the +3 oxidation state. These iron-cyanide complexes are often the predominant cyanide forms found in contaminated groundwater and leachates associated with former MGP and aluminum smelting sites.

Aqueous iron-cyanide complexes are thermodynamically stable in the neutral pH range, and will dissociate only at pH values less than 5 and greater than 11. The kinetics of dissociation are very slow in the dark, except at very low pH. Iron-cyanide complexes are resistant to biodegradation in contrast to free cyanide which can be biodegraded readily. Iron-cyanide complexes are also resistant to decomposition by chemical oxidation techniques such as alkaline chlorination.

U.S. Pat. No. 5,160,632 discloses a process for removing cyanide from cyanide contaminated waste water comprising adjusting the pH of the water to between about 3.0 and 5.0 and adding an effective amount of a ferric iron salt to form a ferric ferricyanide precipitate. The precipitate slurry is then charged to a clarifier in order to settle the ferric ferricyanide sludge.

U.S. Pat. No. 5,266,213 discloses a procedure for cleaning a halogenated organic contaminant from groundwater in an aquifer. This procedure requires maintaining reducing conditions in the aquifer, and bringing the groundwater into intimate contact with a metal; these conditions are believed to cause a chlorine or other halogen atom in the organic contaminant to be replaced by a hydroxyl group, thus releasing the halogen from the contaminant and causing it to go into solution.

U.S. Pat. No. 5,362,394 relates to a procedure for using elemental iron for treating contaminated groundwater in the subsurface environment; the patent does not teach or suggest using iron for the treatment of cyanide contaminated groundwater, however.

U.S. Pat. No. 5,487,622 discloses a system for treating contaminated groundwater in an aquifer by funnelling the water through a gate or gates in a water-tight inground wall; treatment material in the gate breaks down the contaminant, or otherwise removes the contaminant from the flowing water.

U.S. Pat. No. 5,534,154 relates to the treatment of halogenated organic contaminants by passing the water through a permeable mixture of activated carbon and iron filings. A chemically reducing environment and the presence of the metal causes the contaminants to undergo a chemical breakdown. "Recent Advance in Cyanide Waste Reduction Practice" presented at the 18th Purdue Industrial Waste Conference in 1963 describes the use of iron-cyanide precipitation for the treatment of cyanide wastewaters, with the cyanide being removed as a ferric ferricyanide sludge. The treatment processes described are implemented in tank reactors.

None of the above references, however, disclose the methods for treating cyanide contaminated water as practiced in the present invention. Because of the potentially significant toxic effects of cyanide species in humans and aquatic organisms, methods for treating cyanide contaminated water are needed. In addition, because removal of groundwater from its native aquifer is expensive, economic methods for treating cyanide contaminated water in its native aquifer are also needed.

SUMMARY OF THE INVENTION

The present invention has met the above-described needs by providing methods for treating cyanide-contaminated water either above ground or in situ in the subsurface environment. These methods generally involve the use of elemental iron in a fixed, permeable bed, preferably in conjunction with a porous material such as sand to ensure adequate permeability. The elemental iron dissolves partially and forms complexes with the various cyanide species in the water, which ultimately form relatively insoluble iron-cyanide precipitates. These precipitates become adsorbed or physically entrapped in the porous medium. The invention can be employed for cost-effective, in situ treatment of groundwater, and/or fixed-bed treatment of cyanide-bearing wastewater. The methods of the present invention are advantageous when compared with methods currently available in the art in that strong iron-cyanide complexes, as well as free and weakly-complexed cyanide, can be removed and the use of a fixed-bed avoids the continuous generation of sludge associated with existing precipitation techniques.

It is therefore an object of the present invention to provide a method for treating cyanide contaminated water.

A further object of the present invention is to provide a method for treating cyanide contaminated water using elemental iron either alone or in conjunction with a porous medium.

A further object of the present invention is to treat cyanide-contaminated groundwater that has been pumped above ground.

A further object of the present invention is to treat cyanide-contaminated waste leachate that has been collected or pumped from the ground.

Another object of the present invention is to provide a method for treating cyanide-contaminated water, such as industrial wastewater.

A further object of the present invention is to provide an economical method for treating cyanide contaminated groundwater in the ground, serving to arrest the migration of plumes of cyanide contamination and making it possible to avoid implementation of groundwater pump and treat systems which are costly to operate.

These and other objects of the invention will be apparent from the following description of the invention.

DESCRIPTION OF THE PREFERRED EMBODIMENT

Figure 1:
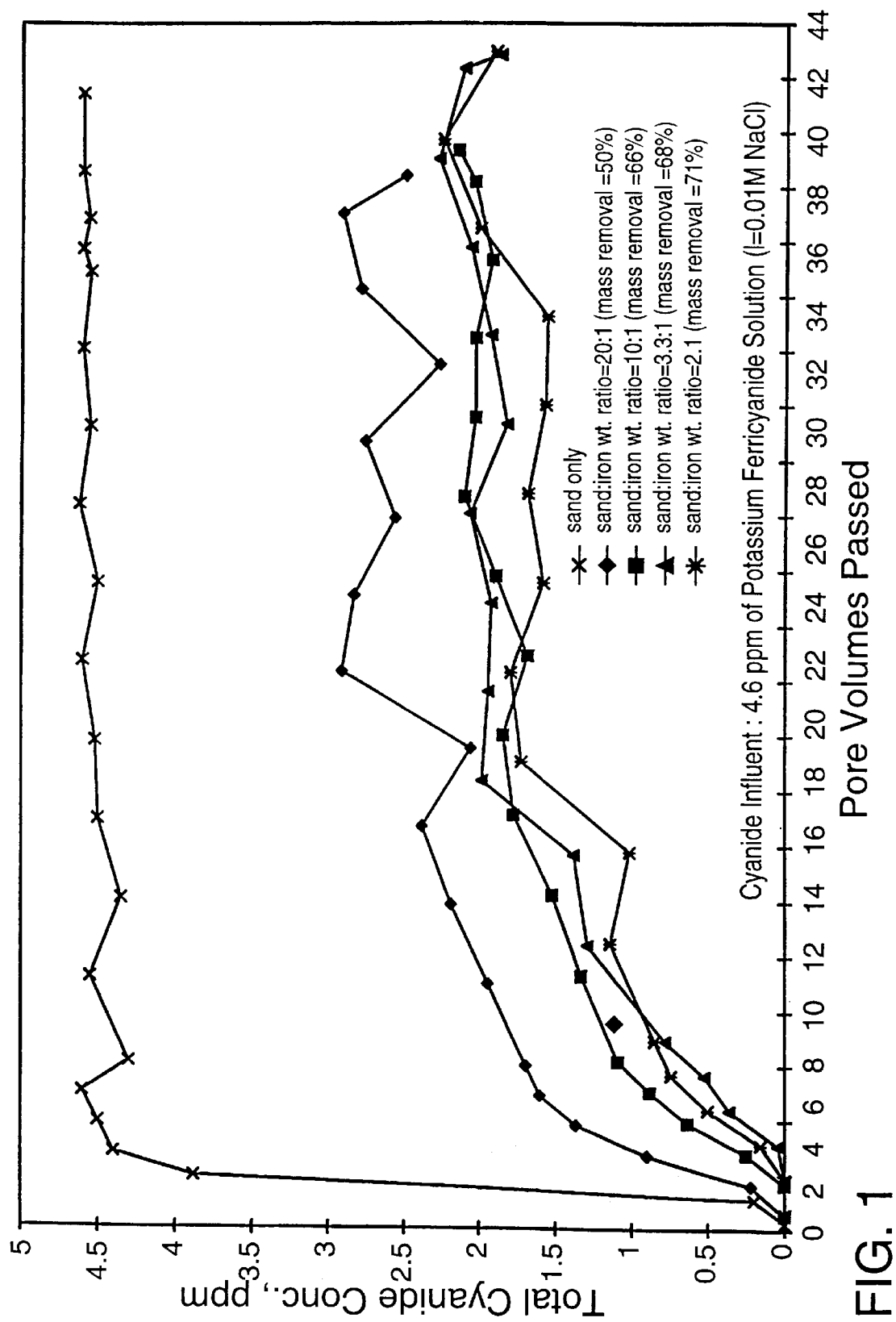
FIG. 1 illustrates cyanide removal from a potassium ferricyanide solution in a constant flow column of sand containing different amounts of iron, by weight, determined according to the methods of Example 1.

The present invention is directed to a method for treating cyanide-contaminated water comprising: passing the water through a fixed, permeable bed containing elemental iron; dissolving at least a portion of the elemental iron in the water; contacting the dissolved elemental iron with cyanide in the water to form an iron-cyanide precipitate; and allowing the precipitate to deposit.

The methods of the present invention can be used to treat water contaminated with cyanide to levels as low as 0.2 to 0.4 parts per million (ppm). The cyanide can exist in any of various forms, including but not limited to, free cyanide forms (HCN or CN$^-$), or in complexes with various metals including but not limited to cadmium, cobalt, copper, iron, nickel and zinc. Iron-cyanide complexes are the most prevalent cyanide contaminants in groundwater. These complexes include, for example, ferrocyanide [Fe(CN)$_6^{4-}$] and ferricyanide [Fe(CN)$_6^{3-}$], in which iron is in the +2 oxidation state or +3 oxidation state, respectively.

Any cyanide contaminated water can be treated according to the methods of the present invention. This includes, but is not limited to, cyanide-contaminated groundwater, which has either been pumped above ground, or remains in situ in its natural aquifer; cyanide present in pumped or collected leachate; or cyanide-contaminated waste water that has been generated in an industrial process. The preferred use is with cyanide-contaminated waters that have low or nondetectable dissolved oxygen concentration.

The term "aquifer" is used herein in its broad sense to signify any in-ground geological formation containing water, including sand, gravel, broken rock and the like, and is not intended to be limited only to those formations which yield a water supply. The kind of aquifer with which the invention is concerned includes sand, gravel, broken rock and the like and is permeable to groundwater. Natural groundwater hydraulic gradients exist in the aquifer, whereby the groundwater naturally moves through the aquifer at a particular velocity in a particular direction. Typically, the moving groundwater is heading towards a surface water body, i.e., river, stream, or lake, although the presence of a well or other water withdrawal can affect the natural flow as well.

When treating water above ground, the treatment can be effected by any means in which the contaminated water is passed through a bed containing elemental iron. Examples of possible configurations include a packed column (similar to a granular activated carbon packed column) or a deep bed filter, which will be well known to those skilled in the art. The origin of this above-ground water will typically be contaminated groundwater that has been pumped above ground, pumped or collected leachate, wastewater, or other industry-generated water that has become contaminated with cyanide. The dissolved elemental iron comes into contact with the cyanide species to form an iron-cyanide precipitate. The contaminated groundwater, leachate, or waste water can be introduced by means of a pump or any other mechanism into a packed column, filter, or other fixed bed containing a mass of subdivided elemental iron, such as iron filings, either alone or with sand, through which the water slowly percolates. A residence time (void volume/flow rate) of at least 3 hours is required for adequate treatment for use of an iron-sand mixture with at least 5 percent iron by weight.

Preferably, the methods of the present invention are used to treat cyanide contaminated groundwater passively while it is still underground. The preferred use is with groundwaters having low or nondetectable concentrations of dissolved oxygen. As in the case of above-ground treatment, when treating water below ground it is necessary to pass the water containing the cyanide species through a fixed bed containing elemental iron. This can be done by any of numerous means known in the art.

For example, a trench can be excavated in the path of the contaminant plume, and a mass of subdivided iron, alone or mixed with a porous material such as sand, placed in the path of the plume. The iron or iron/sand mixture may be placed in the lower part of the trench, while the upper portion of the trench above the vertical extent of the plume may be filled in with the excavated soil or gravel. The trench should be situated and be of such dimensions that substantially all of the plume flows through the body, thus allowing for contact between the elemental iron and the cyanide-bearing solution such that a precipitate is formed.

The iron or iron/sand mixture should not constitute a barrier to the flow of water, so the permeability of the trench material should be no lower than that of the aquifer itself. It may also be preferred, depending on various parameters such as the size and velocity of the plume, to encircle the contaminant plume with the trench containing the iron or iron/sand mixture. Upon exhaustion or in the event of clogging, the iron or iron/sand mixture may be removed from the trench and replaced.

The trench may be created by any conventional trench excavating machinery, and the manner of excavating the trench will be determined mainly by such factors as the nature of the aquifer material, the accessibility of the site to heavy equipment, and the like. Typically, a trench would be excavated into an aquifer material down to an adequate depth using a backhoe type of excavating machine. The trench should be perpendicular to the groundwater flow.

The dimensions of the trench, and the quantity of iron to be placed in the trench, should be such as will ensure an adequate residence time of the cyanide contaminated groundwater with the metal. A residence time for the contaminated water in the fixed bed (with at least 5 percent of iron by weight) of at least 3 hours is required for adequate treatment of cyanide. The width of the trench should be established with this in mind. The trench should be covered so as to minimize intrusion of air or oxygenated water, as optimum performance of the reactive material in the trench occurs with waters having low concentrations of dissolved oxygen.

In an alternative procedure to excavating a trench, the iron or iron/sand mixture can be injected into the ground using a drill-and-jet process. This process is used for forming walls in a geological formation, particularly in loose material such as gravel. In applying the drill-and-jet process to the present invention, a series of bore holes are drilled a suitable distance apart. At each bore hole, a pipe is passed down to the bottom of the bore hole, and the iron/sand mixture is injected under pressure through the pipe into the bore holes. The pipe is then gradually withdrawn up the bore hole. The iron penetrates into the gravel or other material of the aquifer. The bore holes are spaced, and the quantity of iron selected, such that a continuous wall of iron of the required thickness is formed.

The invention therefore provides a method for treating cyanide-contaminated groundwater in the ground, serving to arrest migration of plumes of cyanide contamination and making it possible to avoid implementation of groundwater pump and treat systems which are costly to operate.

Any form of elemental iron in solid form can be used. For example, the elemental iron can be in the form of iron filings, iron pellets, shredded scrap iron, iron cuttings, or iron dust. The iron filings need not be specifically prepared for use in the invention. Use of a form of iron having a high surface area (e.g., iron filings or pellets) is preferred, to ensure sufficient contact between the iron and the cyanide species.

The elemental iron dissolves into the groundwater or wastewater being treated and reacts with the dissolved cyanide to form an iron-cyanide solid precipitate. In a preferred embodiment, the iron is introduced to the water in conjunction with a porous medium, such as sand, to ensure maintenance of flow through the reactive barrier. An iron/sand mixture for use according to the methods of the present invention generally comprises a weight ratio of iron to sand of between about 1:20 and 1:1, with a preferred ratio being 1:10.

Any of various iron-cyanide precipitates will be formed upon the reaction of iron with the cyanide species in the contaminated water. The iron-cyanide solids are relatively insoluble and yield low dissolved cyanide concentrations in solution once they are formed. Thus, the methods of the present invention effectively remove dissolved cyanide species from the groundwater by formation of these relatively insoluble solid-phase complexes.

If the cyanide in the groundwater is in the form of free cyanide it will first form a dissolved iron-cyanide complex. The iron-cyanide complexes either formed from the free cyanide or already existing in the water then react further with iron to form iron-cyanide solid. Some of the solids formed from reaction between the elemental iron and the dissolved iron-cyanide complexes include Prussian Blue precipitate, which forms at lower pH values (pH <6), the Berlin Green precipitate, which forms at neutral pH values, and the Berlin White precipitate, which also forms at neutral pH values. The formation of these various iron-cyanide precipitates is represented in the following reactions:

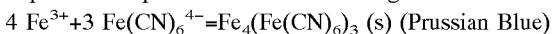
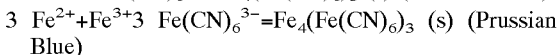
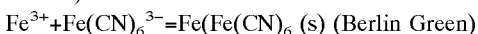
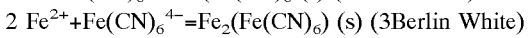

Of the iron-cyanide solids, Prussian Blue is the most widely known because of its vivid blue color and its use in inks and dyes. Prussian Blue is a mixed oxidation state solid that requires moderately reducing conditions to form. Berlin Green forms under oxidizing conditions, and Berlin White forms under reducing conditions. Other types of iron-cyanide solids, including solids containing other metals, for example, copper(II)-iron-cyanide, can also be formed.

EXAMPLES

The following examples are intended to illustrate the invention, and should not be construed as limiting the invention in any way.

Example 1

Iron-cyanide solutions were passed through columns of sand containing various percentages of iron filings, by weight. A small glass column having a diameter of about 2.5 cm was packed with previously washed and oven-dried 30 mesh Ottawa sand containing different weight percents of 40 mesh iron filings. The packed bed length was approximately 10 cm, and the porosity of the mixture averaged about 36%, resembling natural sand/gravel aquifer media. Percentages of iron filings in the sand/iron mixture were 5%, 10%, 30% and 50% by weight. In addition, a test with a column containing only sand was performed. Synthetic iron-cyanide solutions of fixed ionic strength (I=0.01 M NaCl) were passed through the sand/iron mixture. The iron-cyanide solution contained dissolved potassium ferricyanide in water at concentrations of about 4.6 ppm. The iron-cyanide solution was passed through the iron-sand material at a rate of about 1 ml per minute. Effluent samples were collected for analysis of total cyanide using procedures specified in *Standard Methods for the Examination of Water and Wastewater* (by American Public Health Association, American Waterworks Association, Water Environment Federation, 19th Ed. 1995).

FIG. 1 illustrates the cyanide removal in a constant flow column for the different amounts of iron by weight of sand. "Pore volumes passed" is a measure of the total volume of contaminated water passed through the porous bed in the column, given in terms of the number of bed void (pore) volumes. As car be seen in FIG. 1, the effluent cyanide concentration in ppm was significantly higher when using sand alone, than when using sand mixed with the iron. Increasing the percentage by weight of the iron in the iron/sand mixture yielded progressively better removal of the cyanide up to about 30 to 50% by weight of iron. At that point, the effluent concentration stabilized at about 1.5 ppm total effluent cyanide, indicating either a solubility limitation or a dissolution kinetics limitation. The cyanide removal efficiency under this steady-state condition was about 70%.

Example 2

Figure 2:
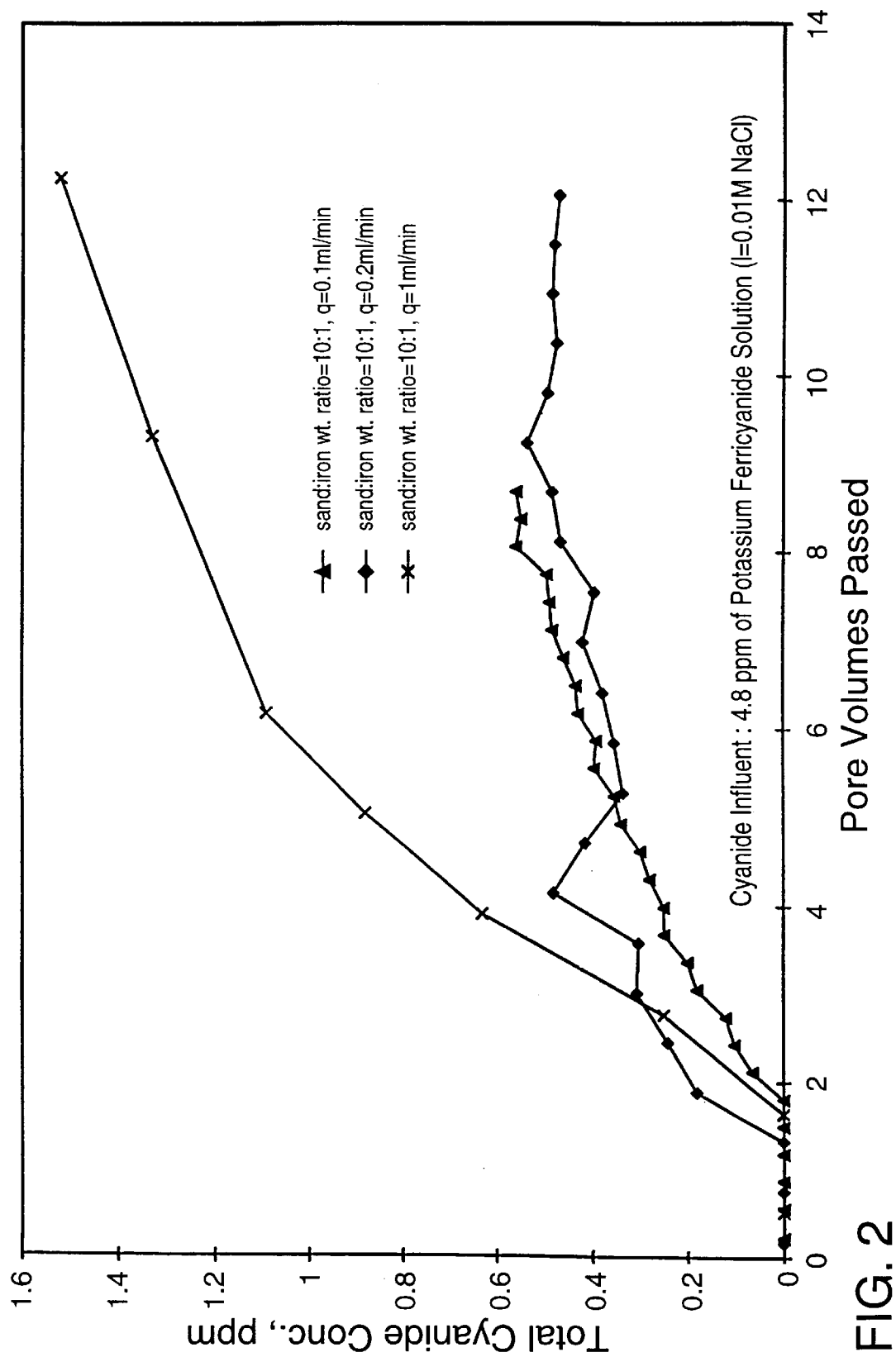
FIG. 2 illustrates cyanide removal from a potassium ferricyanide solution in a column of sand containing 10% iron, by weight, using different flow rates, determined according to the methods of Example 2.

Iron-cyanide solutions were passed at various flow rates through small columns of sand as described in Example 1, but containing 10% iron filings, by weight. The iron-cyanide solution as described in Example 1 was used, but with a cyanide concentration of 4.8 ppm. The example was conducted using flow rates of 1, 0.2 and 0.1 ml per minute. The results are presented in FIG. 2. As shown in the figure, flow rates between 0.1 and 0.2 ml per minute yielded effluent cyanide concentrations in the range of 0.4 to 0.5 ppm. This represented a removal of about 90% of the cyanide from the solution.

Example 3

Figure 3:
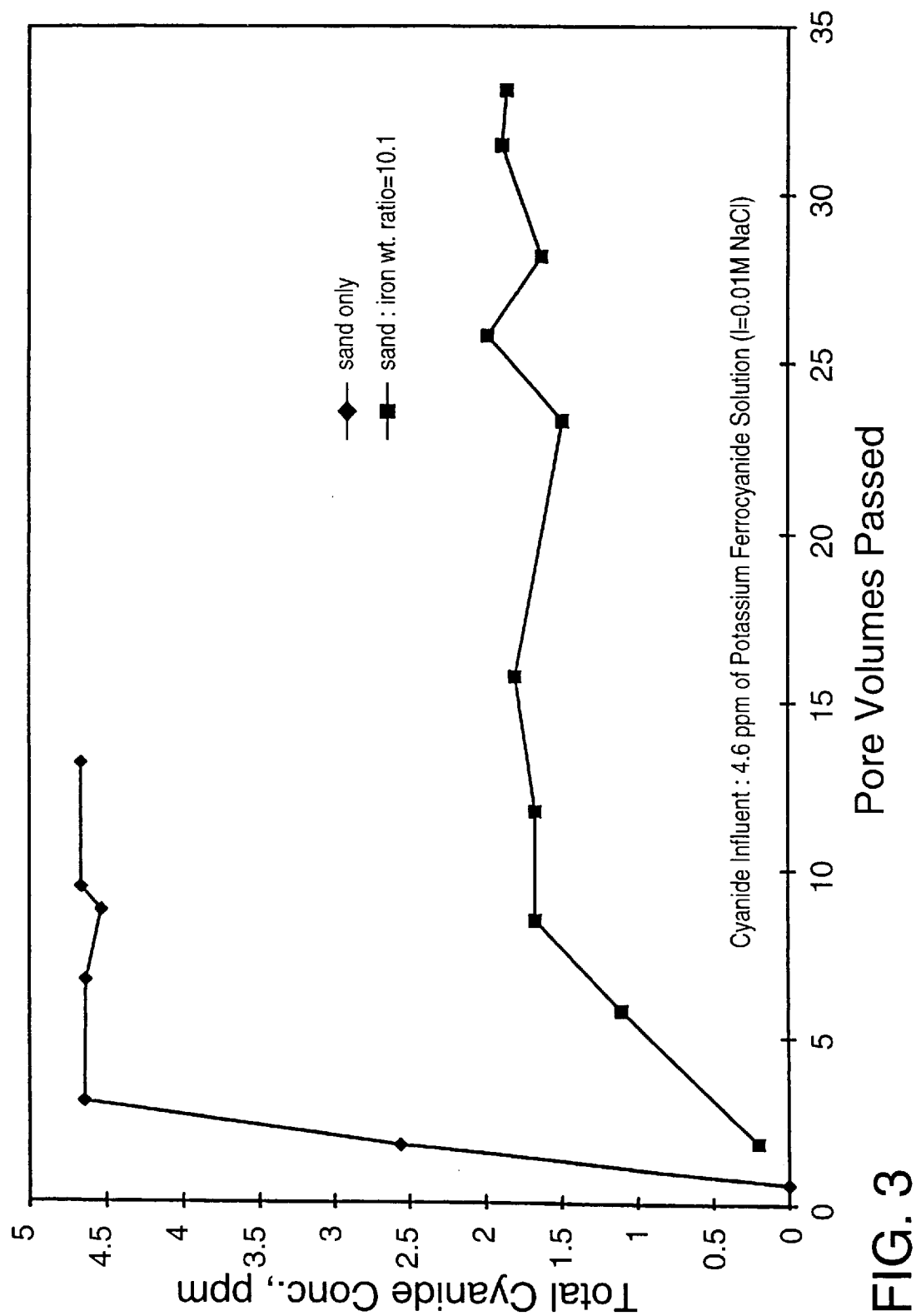
FIG. 3 illustrates cyanide removal from a potassium ferrocyanide solution in a column of sand containing 10% iron, by weight, determined according to the methods of Example 3.

An iron-cyanide solution containing dissolved potassium ferroczyanide in water at a concentration of about 4.6 ppm (as CN) was passed through a small column of sand as described in Example 1, but containing 10% iron filings, by weight. The flow rate in the test was 0.1 ml per minute. For comparison, a test involving passage of the ferrocyanide solution through sand alone at 0.1 ml per minute was also run. Results are presented in FIG. 3, where it is shown that a steady-state effluent total cyanide concentration of approximately 1.8 ppm was achieved. This represents a removal of about 60% of the cyanide from the solution. In the absence of iron filings, the ferrocyanide solution passed through the column in one pore volume, indicating no retention in the column. This confirms the effectiveness of the elemental iron in removing ferrocyanide.

Whereas particular embodiments of this invention have been described above for purposes of illustration, it will be evident to those skilled in the art that numerous variations of the details of the present invention may be made without departing from the invention as defined in the appended claims.

What is claimed is:

1. A method for treating cyanide contaminated water comprising:
   passing said water through a fixed, permeable bed containing elemental iron;
   dissolving at least a portion of said elemental iron in said water;
   reacting said dissolved elemental iron with cyanide in said water to form an iron-cyanide precipitate; and
   allowing said precipitate to deposit in said fixed, permeable bed.

2. The method of claim 1, wherein said cyanide is selected from the group consisting of dissolved cyanide and an iron-cyanide complex.

3. The method of claim 1, including employing elemental iron selected from the group consisting of iron filings, iron pellets, shredded scrap iron, iron cuttings, and iron dust.

4. The method of claim 1, including adding a porous material to said permeable bed in which said precipitate deposits.

5. The method of claim 4, including employing sand as said porous material.

6. The method of claim 5, including employing an permeable bed containing a weight ratio of between about 1:20 and 1:1 iron to sand.

7. The method of claim 5, including employing an permeable bed containing a weight ratio of about 1:10 iron to sand.

8. The method of claim 1, including employing said method to treat said cyanide-contaminated water above ground.

9. The method of claim 8, wherein said water is cyanide-contaminated groundwater that has been pumped from the ground.

10. The method of claim 8, wherein said water is cyanide-contaminated leachate that has been collected or pumped from the ground.

11. The method of claim 8, wherein said water is cyanide-contaminated wastewater.

12. The method of claim 8, further including the step of removing said iron-cyanide precipitate by a method selected from the group consisting of replacement of the bed and liquid extraction of the iron-cyanide precipitate.

13. The method of claim 12, including the step of providing a plurality of bore holes in said aquifer in the flow path of said groundwater and injecting said elemental iron bed into said bore holes such that at least some of said groundwater passes through said bed.

14. The method of claim 1, including employing said method to treat said cyanide contaminated groundwater in situ in a subsurface environment.

15. The method of claim 14, whereby formation of an iron-cyanide precipitate below ground removes cyanide from the groundwater.

16. The method of claim 14, including the step of excavating a trench in said aquifer in the path of said groundwater and placing said elemental iron bed in said trench such that said groundwater passes through said bed.

17. The method of claim 1, wherein said cyanide contaminated water has been contaminated with one or more members selected from the group consisting of free cyanide, weak metal-cyanide complexes, and iron-cyanide complexes.

18. The method of claim 1, wherein said cyanide contaminated water has a cyanide concentration of at least 0.2 parts per million.

19. The method of claim 1, wherein said cyanide contaminated water has a cyanide concentration of at least 0.4 parts per million.

* * * * *

UNITED STATES PATENT AND TRADEMARK OFFICE
CERTIFICATE OF CORRECTION

PATENT NO. : 5,837,145

DATED : November 17, 1998

INVENTOR(S): Dzombak et al.

It is certified that errors appear in the above-identified patent and that said Letters Patent should be corrected as shown below:

Cover Page, --John R. Smith-- should be added as an inventor under Inventors

Col. 6, line 18, add a --+-- sign after the $3^+$ and before the 3

Col. 6, line 21, remove the "3" before "Berlin"

Col. 6, line 66, the word "car" should be --can--,

Col. 7, line 26, the word "ferroczyanide" should be changed to read --ferrocyanide--, Signed and Sealed this Fourteenth Day of December, 1999

Attest:

Q. TODD DICKINSON

*Attesting Officer*      *Acting Commissioner of Patents and Trademarks*